US005316040A

United States Patent [19]

Townsend et al.

[11] Patent Number: 5,316,040

[45] Date of Patent: May 31, 1994

[54] VALVE ALIGNMENT TOOL

[76] Inventors: Robert L. Townsend, 11942 Chapel Rd., Clifton, Va. 22024; Alfred G. Downs, Rte. 2; Box 225 R, Bluemont, Va. 22012

[21] Appl. No.: 37,437

[22] Filed: Mar. 26, 1993

[51] Int. Cl.[5] .......................... F16K 37/00; F16L 5/00

[52] U.S. Cl. ...................................... 137/556; 137/365

[58] Field of Search ................................ 137/363-371, 137/291, 551, 556, 554

[56] References Cited

U.S. PATENT DOCUMENTS

| | | | |
|---|---|---|---|
| 407,955 | 7/1889 | Kallaher et al. | 137/369 |
| 536,268 | 3/1895 | Cullen | 137/365 |
| 820,616 | 5/1906 | Batt | 137/365 |
| 2,059,085 | 10/1936 | Buck | 137/364 |
| 4,556,081 | 12/1985 | Gagas | 137/364 |
| 4,697,607 | 10/1987 | Aalto et al. | 137/556 |

*Primary Examiner*—A. Michael Chambers

[57] ABSTRACT

A valve alignment tool for correctly aligning the valve box above each shut off valve in the water pipes of a underground water main. The valve alignment tool fits over the square stem nut of the gate valve, and fits in sliding engagement with the valve box to align the bottom of the valve box around the square stem nut of the gate valve. The top of the valve alignment tool protrudes above the surface of the ground and contains a bubble level so that it can be held vertically as the sections the valve box are slid down the outside of the valve alignment tool. When the trench around the underground water main has been filled in, and the top section of the valve box has been put in place, the valve alignment tool is withdrawn.

3 Claims, 5 Drawing Sheets

VALVE ALIGNMENT TOOL

CROSS-REFERENCE TO RELATED APPLICATION

This invention is not disclosed in any co-pending application for a patent or any issued patent.

BACKGROUND OF THE INVENTION

The construction of underground water mains involves several steps. First trenches are dug to below the frost line for the underground water main, and each of the branches to each building. Next the water pipes are laid in the trenches and are connected together. Both ends of each underground water main are supplied with water, and underground water mains are placed periodically to allow any section to be isolated. At each branch there is also a shut off valve. This arrangement allows the branch, or either side of the main to be isolated.

Multi-part valve boxes are placed above the valve stem to create a channel to the surface, which is capped. When the cap is removed, and a valve wrench is lowered to the valve stem, the valve may be opened or shut from the surface. For the valve wrench to operate the valve, the valve box must be accurately located around the valve stem, and the valve box must be vertical or plumb.

The valve boxes are manually placed on the valve as the trench is being filled in and the dirt is being tamped. The valve box may be inaccurately placed laterally or may be moved, during the filling operation, by the machinery or by the uneven pressure of the untamped earth. The valve box may be inaccurately placed vertically, or bent at a joint, or may be moved during the filling operation. In either case, if the valve boxes are inaccurately placed, the valve wrench cannot turn the valve stem, and the valve box must be dug up and re-set.

SUMMARY OF THE INVENTION

A valve alignment tool for correctly aligning the valve box above each shut off valve in the water pipes of a underground water main. The valve alignment tool fits over the square stem nut of the gate valve, and fits in sliding engagement with the valve box to align the bottom of the valve box around the square stem nut of the gate valve. The top of the valve alignment tool protrudes above the surface of the ground and contains a bubble level so that it can be held vertically as the sections the valve box are slid down the outside of the valve alignment tool. When the trench around the underground water main has been filled in, and the top section of the valve box has been put in place, the valve alignment tool is withdrawn.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

The invention will be better understood and the objects other than those set forth above will become apparent when consideration is given to the following detailed description thereof. Such description makes reference to the annexed drawings wherein.

DESCRIPTION OF THE PREFERRED EMBODIMENTS

Figure 1:
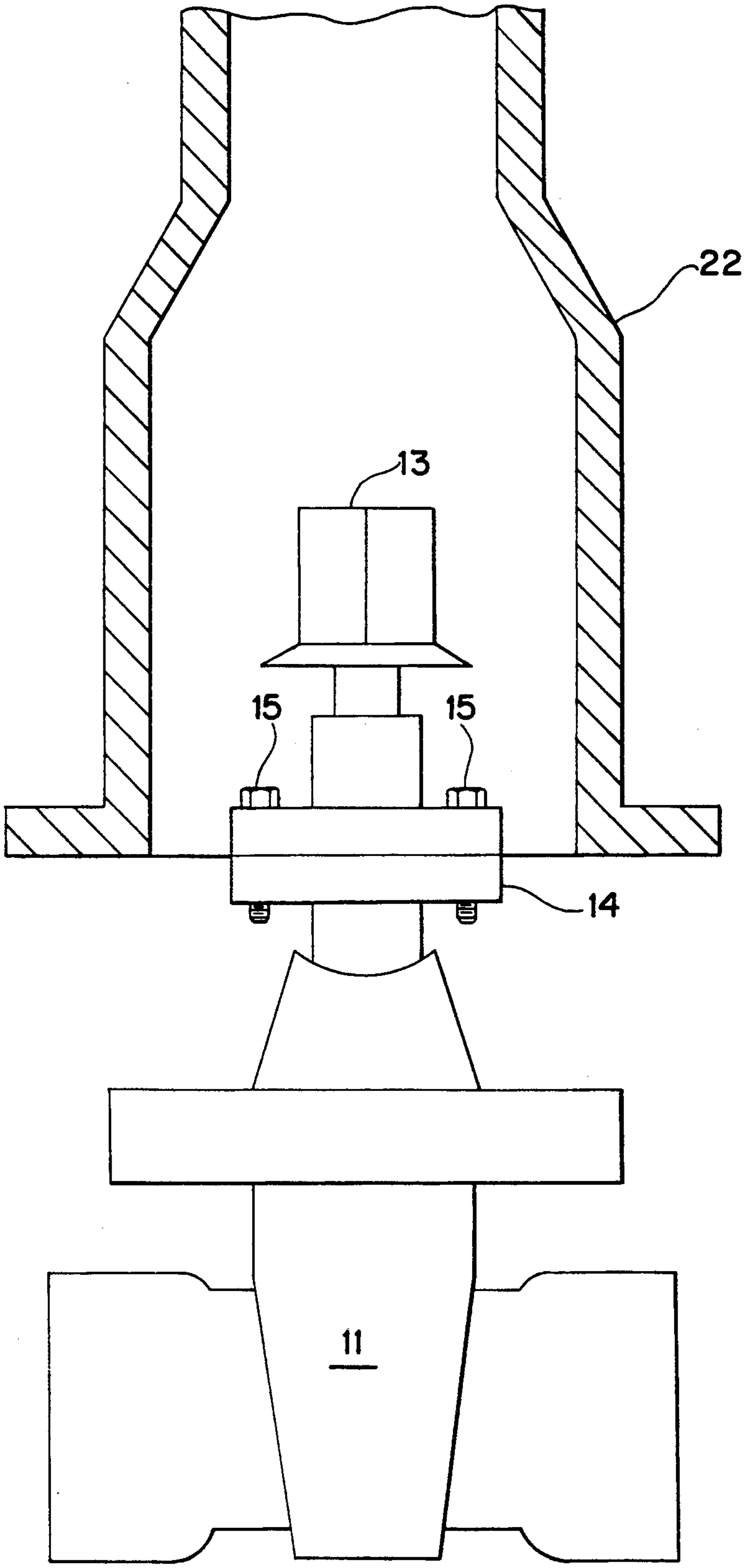
FIG. 1 is a partial sectional side view of a underground water main shut off valve and valve box.
Figure 2:
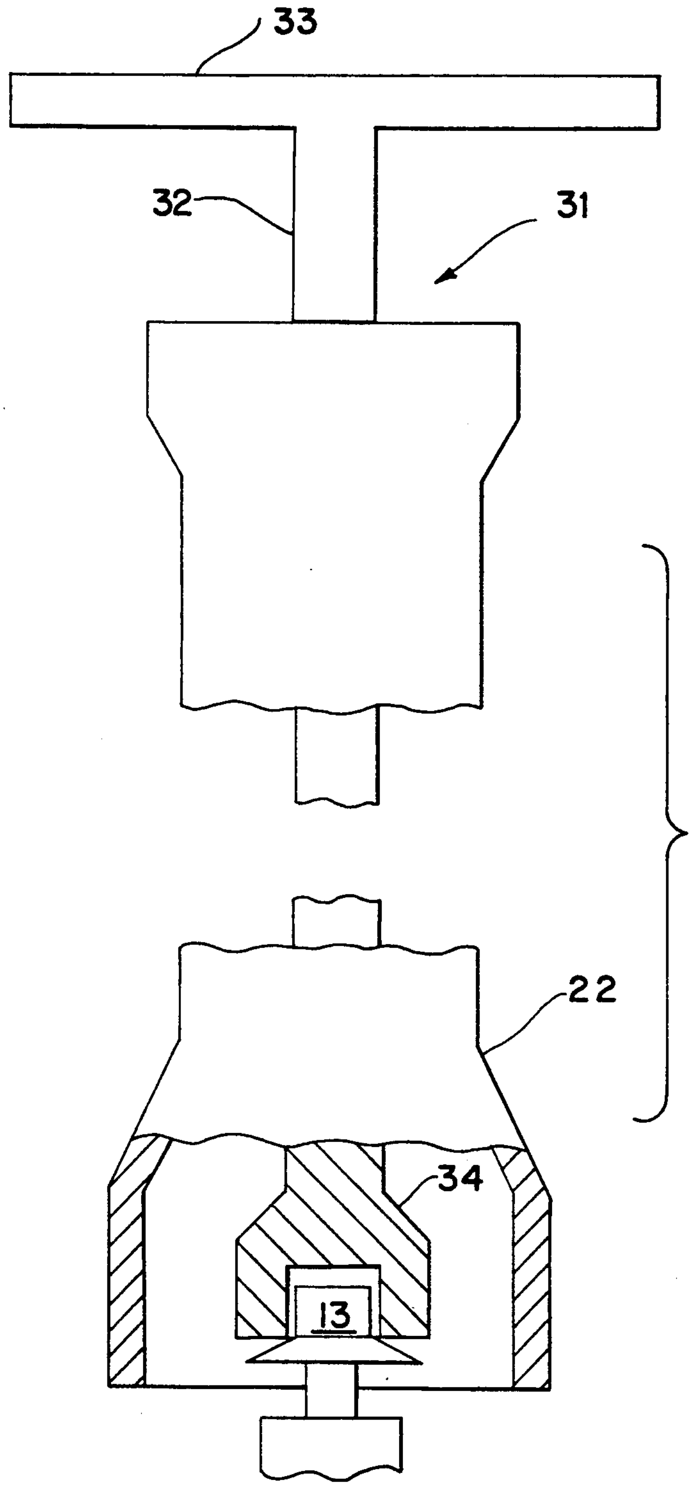
FIG. 2 is an exploded view of a shut off valve, a valve box and a valve wrench.
Figure 3:
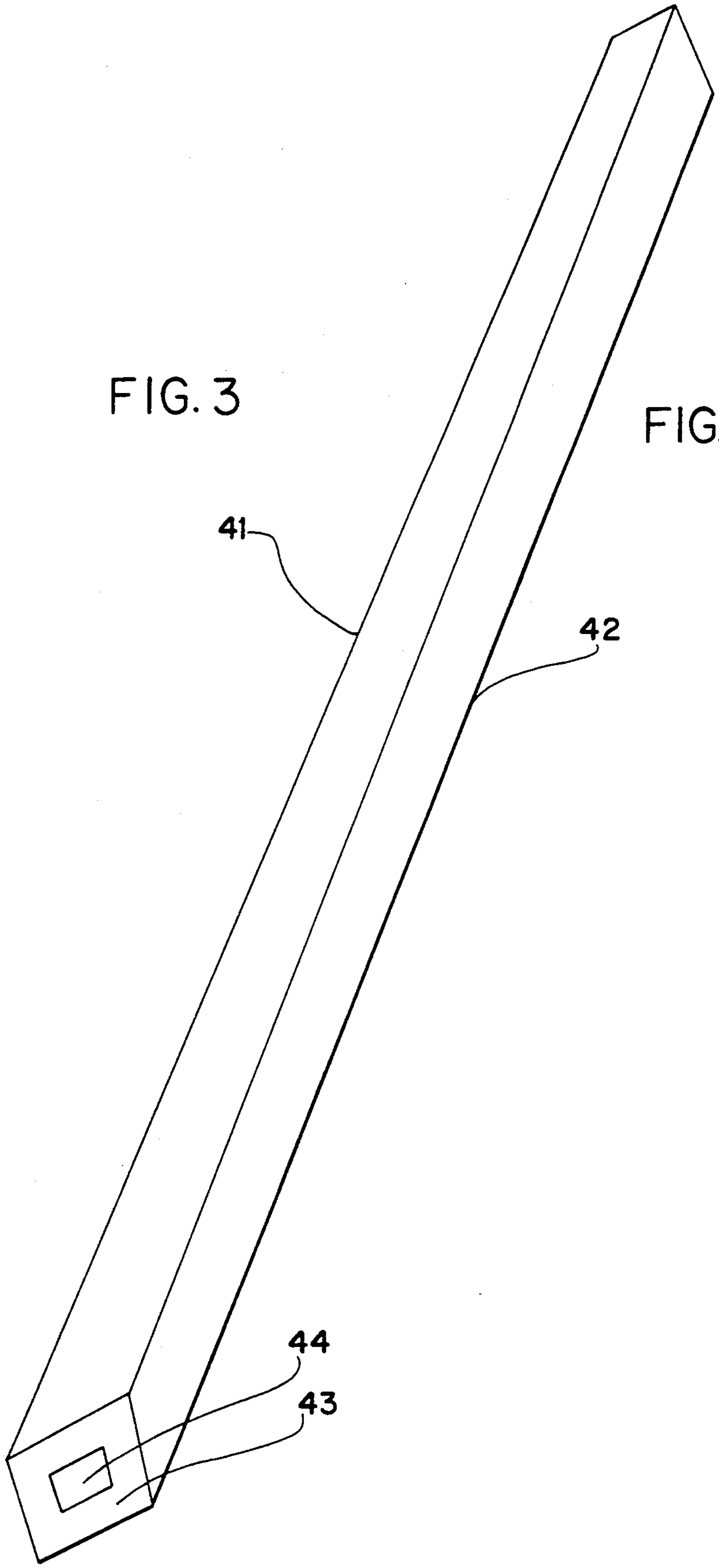
FIG. 3 is a sectional side view of a shut off valve, and a valve box with the valve alignment tool of the present invention inside.

A shut off valve and a valve box are shown in FIGS. 1, 2 and 3. The water pipes of an underground water main will vary from 6 to 36 inches in diameter. Accordingly, the shut off valves will vary in size. However all shut off valves terminate in the same size fitting so that they all may be operated by a single size valve wrench 31. Each shut off valve is a rotating stem gate valve 11, terminating in an identical square stem nut 13, which is 2 inches high and $2\frac{1}{8}$ inches wide at the base and 2 inches wide at the top. The square stem nut 13 is centered above the stem cap 14, which is held onto the body of the rotating stem by four cap bolts 15.

Each bottom section 22 of the valve box 21 is identical in cross section, but may vary in length, usually 15, 24 or 36 inches. The internal diameter of the bottom section 22 is $5\frac{1}{2}$ inches at the top and flares at the bottom to an internal diameter of 7 inches. This permits the bottom portion of each succeeding bottom section 22 to be placed around the top of the next lower bottom section 22. At the bottom edge of each bottom section 22 is a rim which extends to $10\frac{1}{4}$ inch diameter. This rim forms a ring on which the lowest bottom section 22 fits around or on top of the stem cap 14.

The top section 23 of the valve box 21 fits around the top part of the uppermost bottom section 22. At the bottom of the top section 23 is a rim which forms a ring which rests on earth which is laid to the right level to put the top of the top section 23 at the street level. Inside the top of the top section 23 is a lock or drop lid.

A valve wrench 31 has a wrench stem 32 of a length appropriate for the depth of the underground water mains being worked on. One end of the wrench stem 32 terminates in a box end 34. The other end of the wrench stem 32 terminates in a wrench handle 33. The internal dimension of the box end 34 will be $2\frac{1}{8}$ inches to fit around the square stem nut 13 of the gate valve 11.

As shown in FIG. 2, to close a gate valve 11, a worker removes the lid and lowers the valve wrench 31 down the channel inside the valve box 21. The valve wrench 31 is rotated until the box end 34 is able to slide down the sides of the square stem nut 13. The worker is then able to close the gate valve 11 by turning the wrench handle 33. For the smallest gate valve 11, only a quarter turn is necessary. A larger gate valve 11 will have internal gearing so multiple turns will be necessary.

Figure 4:
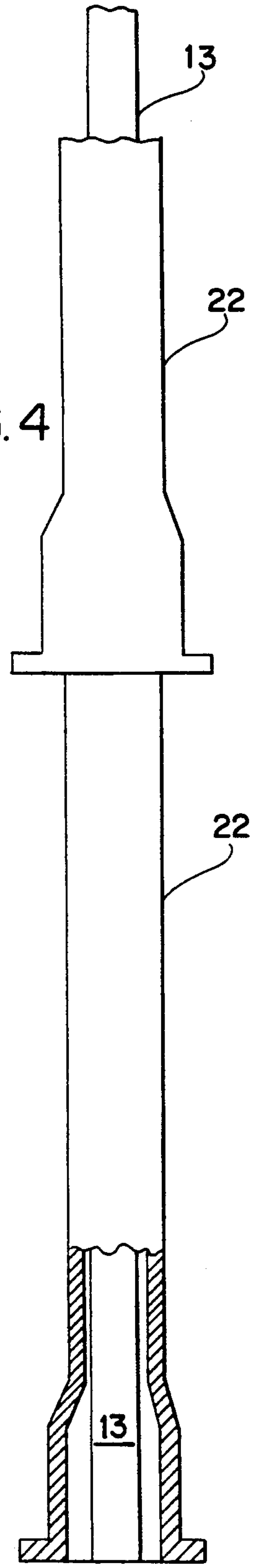
FIG. 4 is a bottom perspective of the valve alignment tool.
Figure 6:
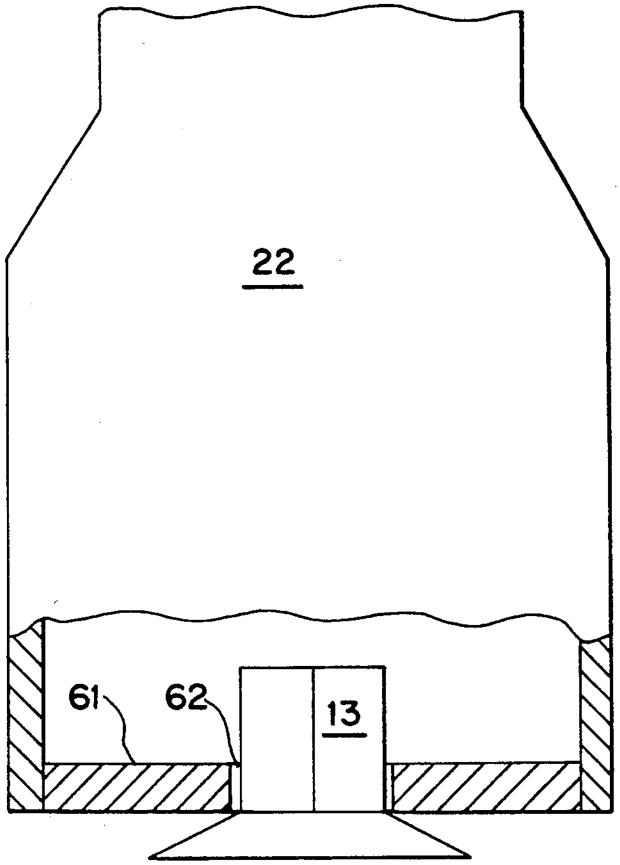
FIG. 6 is a partial sectional view of another version of a valve alignment tool, designed for permanent installation.
Figure 5:
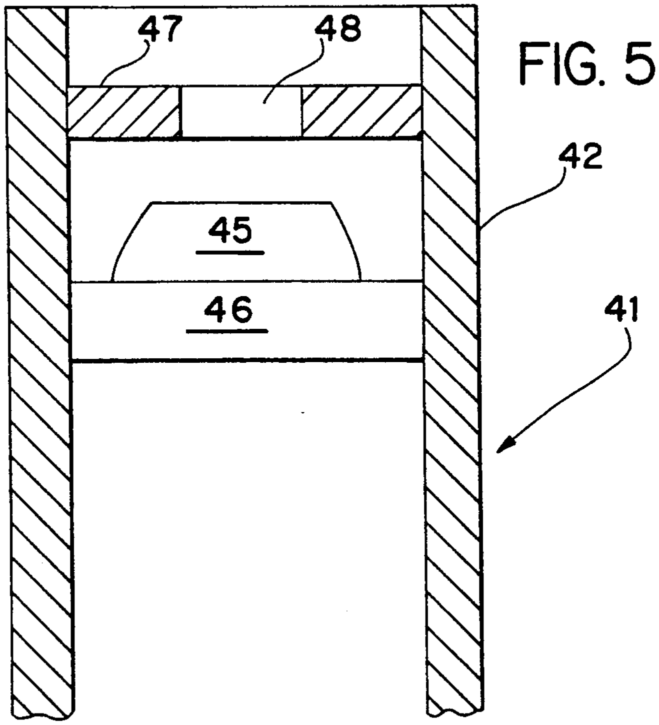
FIG. 5 is a side sectional view of the top of the valve alignment tool showing the bubble level.

As shown in FIGS. 3, 4 and 5, the valve alignment tool 41 is a square rectangular shaft 42 of about four feet in length and $3\frac{1}{4}$ inches in width. This gives a diagonal of about $4\frac{5}{8}$ inch, so the valve alignment tool 41 can fit easily inside of each bottom section 22 and the single top section 23 of the valve box 21. The side edges of the valve alignment tool 41 should be rounded to allow an easier sliding fit inside of the valve box 21. The body of the valve alignment tool 41 may be of aluminum, plastic, fiberglass or wood. The thickness of the body must be sufficient to resist the forces in use and the environment of a construction site. A thickness of $\frac{1}{8}$ inch is sufficient for aluminum.

At the bottom of the valve alignment tool 41, and inside the body, is a bottom plate 43 having a rectangular aperture 44 of 2 3/16 inches on each side. Near the top of the valve alignment tool 41 is a interior plate 46 onto the top of which is mounted bubble level 45. Above the bubble level 45 is top plate 47 which has a circular aperture 48. This arrangement allows the bubble level 45 to be inside of the shaft 42, and protected from any accidental direct blow by machinery at the construction site.

In use, the valve alignment tool 41 is placed over the gate 10 valve 11 before any earth is filled into the trench. The rectangular aperture 44 of the bottom plate 43 is placed around the square stem nut 13 and the first bottom section 22 of the valve box 21 is lowered around the valve alignment tool 41 and placed around the stem cap 14, where it rests on earth filled to that level. As earth is added to the trench, the top of the valve alignment tool 41 is held level by observing the bubble level 45, holding the shaft 42 vertical. The valve alignment tool 41 holds the entire bottom section 22 both vertical and centered around the square stem nut 13. As each new bottom section 22 is added, the valve alignment tool 41 is kept vertical with the bubble level 45, thus ensuring the entire valve box 21 is centered, is straight, and is vertical. The top section 23 is placed around the last bottom section 22, and the valve alignment tool 41 is then withdrawn from the valve box 21.

A permanent aligning disc 61 may be installed inside the base of the first bottom section 22, either before the valve alignment tool 41 is placed on the square stem nut 13 or in place of it. The outer diameter of the aligning disc 61 will be about 7 inches to fit snugly inside the flared part of the bottom section 22. The centered aperture 62 is 3 inches in diameter to fit around the square stem nut 13. The thickness of the aligning disc 61 is about one inch. The aligning disc 61 may be made of a variety of materials having intermediate strength. It should be strong enough to resist the normal forces encountered in filling and aligning the valve box 21. However it should not be so strong that the gate valve 11 will be broken if a heavy blow lands on the exposed valve box 21 during the time the trench is being filled in. The centered aperture 62 permits the square stem nut 13 to be turned by the valve wrench 31, thus making it a permanent valve aligning tool.

Figure 9:
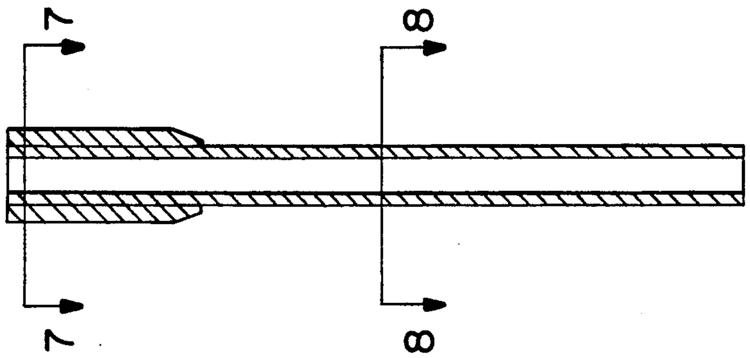
FIG. 9 is a side view of the embodiement shown in FIG. 7.
Figure 8:
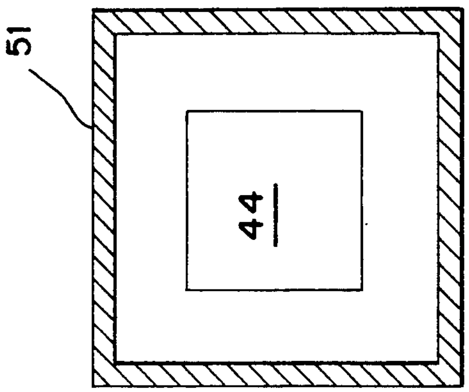
FIG. 8 is a bottom view of the embodiement shown in FIG. 7.
Figure 7:
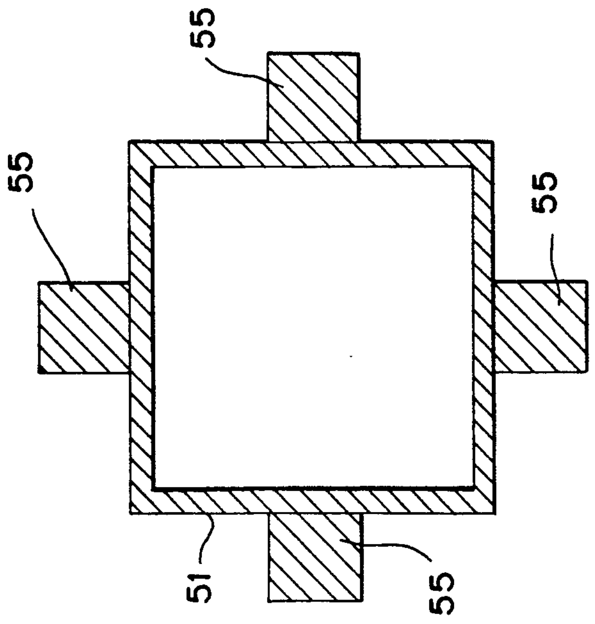
FIG. 7 is a top view of another embodiement of the invention.

FIGS. 7, 8, and 9 disclose another embodiement if the invention. The shaft 51 is similar to the shaft 42 of the FIGS. 3 and 4. At the top of shaft 51, four bars 55 are attached onto the outer walls. These bars 55 align the top section 23, which has a larger internal diameter than bottom section 22.

The valve alignment tool 41 may have a circular shaft 42 rather than a rectangular one. In this case three or four small diameter rods may be added to the outside, running the length of the shaft 42, to provide the sliding surfaces to co-operate with the valve box 21.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An underground water main valve alignment tool for installing a valve box, as the trench is being filled in, above a rotating stem gate valve having a square stem nut, comprising in combination; centering means on said tool cooperating with the square stem nut to place the axis of the valve box above the quare stem nut; aligning means on said tool, co-acting with said centering means, along the longitudinal axis of said tool, cooperating with an interior portion of said valve box to place the longitudinal axis of the valve box in vertical alignment; and, means on said tool to hold the valve box in vertical alignment as the earth is filled into the trench.

2. The combination of claim 1 including a second set of edges at the top of the tool in sliding engagement with a top section of the valve box.

3. The combination of claim 1 including a bubble level at the top of the tool, said bubble level aligned to show when the shaft is vertical.

* * * * *